Dec. 26, 1939.   A. LANGSNER   2,184,351
SURVEYING INSTRUMENT
Original Filed March 16, 1935
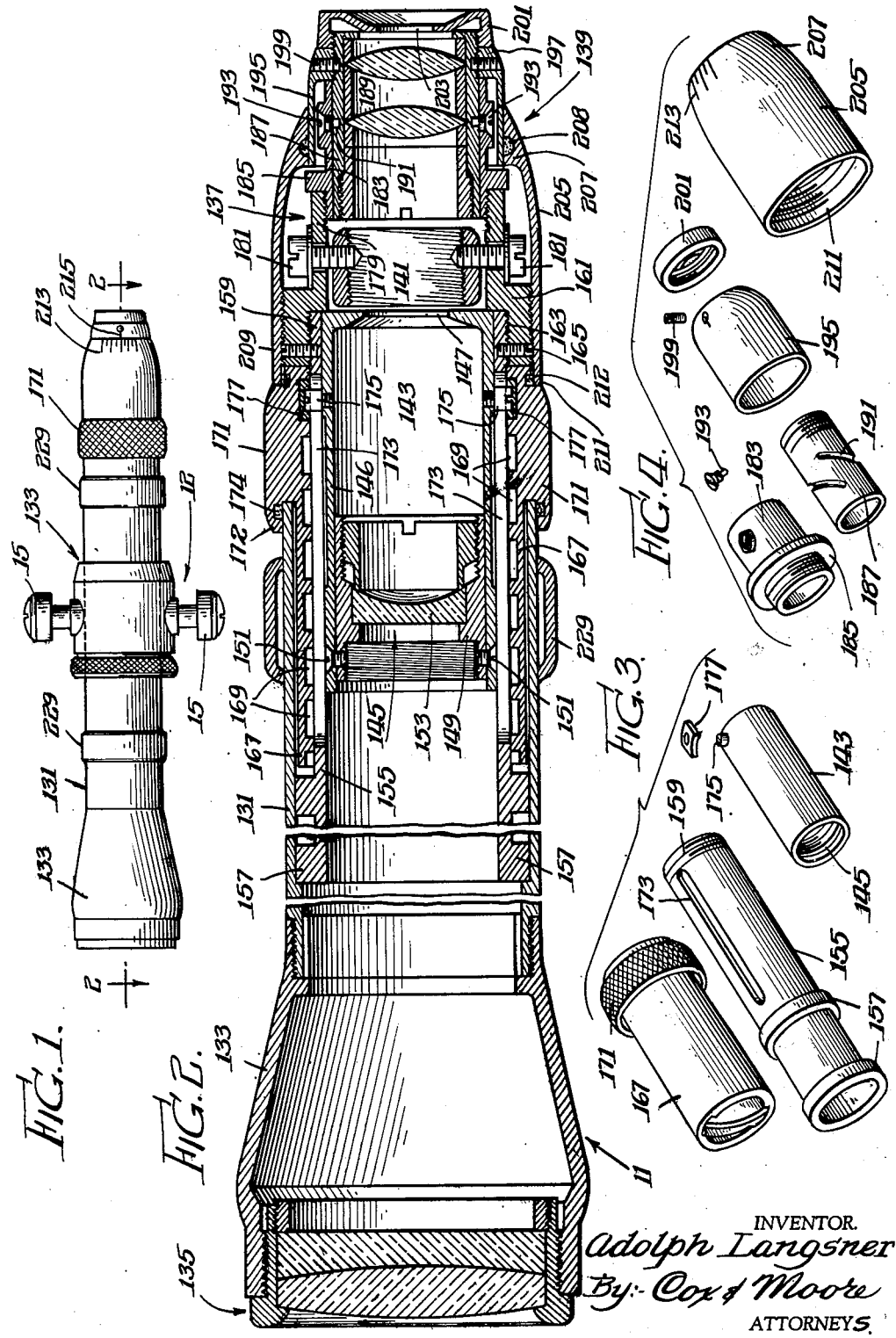
INVENTOR.
Adolph Langsner
By: Cox & Moore
ATTORNEYS.

Patented Dec. 26, 1939

2,184,351

UNITED STATES PATENT OFFICE 2,184,351

SURVEYING INSTRUMENT

Adolph Langsner, Chicago, Ill., assignor to Eugene Dietzgen Company, Chicago, Ill., a corporation of Delaware Original application March 16, 1935, Serial No. 11,525. Divided and this application January 31, 1938, Serial No. 187,995

5 Claims. (Cl. 88—32)

My invention relates in general to measuring instruments and has more particular reference to alidades and similar precision instruments for use in surveying, the same comprising subject-matter divided from my copending application, Serial No. 11,525, filed March 16, 1935 which application has matured into Patent No. 2,132,171 issued Oct. 4, 1938.

An important object is to provide a telescope having an adjustable eye-piece and cross-hair reticle, including means accessible from outside of the telescope for adjusting the eye-piece and reticle, with a sleeve-like cover for enclosing the eye-piece and reticle adjusting means; a further object being to provide the foregoing construction in a telescope having objective focusing means therein and a turnable collar on the barrel of the telescope for shifting the objective focusing means, said turnable collar having portions cooperating with the sleeve-like cover in order to prevent entrance of dust and other foreign media within the barrel and eye-piece structure of the telescope.

Another important object is to provide a novel telescope objective focusing means comprising a collar enclosing the barrel of the telescope and operatively connected for shifting an objective focusing lens longitudinally within the barrel wherein the collar cooperates with the barrel of the telescope to prevent entrance of dust and other foreign matter to said focusing lens.

Another important object is to provide a telescope comprising a sleeve-like barrel having a guide-way for shiftable focusing means anchored within the barrel and providing a space between the parts within which is housed a sleeve-like adjusting device for moving the focusing means longitudinally of the barrel, the guide having an end projecting outwardly of the barrel in position to carry an eye-piece assembly in line with the focusing means whereby the eye-piece assembly may be utilized to retain the sleeve-like adjusting device in operating position with a manually operable portion of the device exposed between the eye-piece assembly and the end of the barrel of the telescope; a further object being to arrange the exposed portion of the sleeve-like device to cooperate with the eye-piece assembly as well as with the telescope barrel for the purpose of excluding dust and other foreign matter from the operating portions of the telescope.

Among the other important objects is to provide a surveying instrument having an improved appearance, including dust-proof adjusting devices including means formed and arranged for protecting said devices from injury; to provide a dust-proof eye-piece and objective focusing assembly; to utilize a rotatable collar for objectively focusing the telescope; to utilize cam means in connection with a rotatable sleeve for accomplishing the adjustment of the objective focusing means; to provide a dust-seal in cooperation with the eye-piece focusing means and a cover for reticle adjusting devices in telescopes having an eye-piece including an adjustable reticle means; and to provide a dust-seal through the cooperation of the objective focusing means and a removable cover sleeve forming a part of an eye-piece assembly adjacent the objective focusing means.

Numerous other objects and advantages of the invention will be apparent from the following description, which, taken in connection with the accompanying drawing, discloses preferred embodiments of my invention.

Referring to the drawing:

Figure 1 is a side elevation of an instrument embodying the features of my present invention;

Figure 2 is an enlarged sectional view taken substantially along the line 2—2 in Figure 1; and Figures 3 and 4 are exploded assembly views of parts of the device shown in Figure 2.

To illustrate my invention, I have shown, on the drawing, a surveying instrument comprising a sighting device 11 and support means 12 for tiltingly carrying the sighting device in operative position. The sighting device 11 preferably comprises a telescope supported in a sleeve-like frame 13 having projecting axles 15 adapted to be carried in bearings formed in a suitable support frame.

The telescope or sighting device 11 comprises a tubular, preferably cylindrical barrel 131, which is or may be provided with a belled extension 133 at one end to receive an objective lens cell 135. At its opposite end, the telescope barrel is provided with an eye-piece assembly 137 including an eye-piece focusing device 139 and an adjustable reticle 141. The barrel also carries an objective focusing means 143 between the eye-piece and objective lens assemblies. The objective focusing means is slidable longitudinally within the barrel and carries a focusing lens cell 145 fitted therein for the purpose of objectively focusing the telescope. The objective focusing means comprises a preferably cylindrical sleeve 146 having an aperture 147 in its end facing the eye-piece assembly, said sleeve carrying a frame 149 secured thereto, at its end opposite the aperture 147, in any suitable fashion as by means of the holding screws 151. The frame 149 carries the focusing lens 153 in alignment with the aperture 147. Means comprising the knurled collar 171 is operable outwardly of the barrel of the telescope for adjusting the position of the slide within the barrel. The reticle also is adjustable by means of the screws 181 which are exposed outwardly of the telescope barrel and normally closed by a readily removable sleeve-like cover 205. The eye-piece also has a turnable part 195 projecting from an end of the cover for focusing the same on the cross hair reticle 141; and a scale 213 and cooperating index 215 may be arranged on the part 195 and the cover to indicate the adjustment of the eye-piece.

The objective focusing means 143 is carried in a frame 155 comprising a cylindrical element fitted and secured in the barrel in any suitable fashion as at 157. The frame 155 has an extension 159 projecting outwardly of the eyepiece end of the barrel, and the eye-piece assembly is carried on a frame 161, which is threaded or otherwise suitably mounted, as at 163, upon the projecting end of the frame 155 and secured in place by means of the fastening screws 165. The frame 155 has an external diameter somewhat less than the internal diameter of the barrel to provide an annular space between the barrel and said frame. An elongated sleeve-like nut 167 is mounted in this annular space with the threads 169 of the nut facing inwardly on the extension 159. The sleeve-like nut 167 at the end of the barrel is formed with an annular collar 171 resting on and overlying the end of the barrel, said collar having a flange 172 to embrace the end of the barrel so that the parts are interfitted in a manner preventing the entrance of dirt, moisture and other foreign matter between the end of the barrel and said nut. If desired, resilient packing 174 may be arranged in a groove in the collar to enhance the sealing effect. The peripheral surfaces of the collar 171 are preferably knurled in order to facilitate turning of the same in rotating the nut 167.

The frame 155 is provided with longitudinally extending slots 173 in its opposite walls and the focusing means 146 carries radially extending pins 175, which pass through the slots 173 and have heads extending in the threads 169 of the nut. The heads of the pins are provided with bearing blocks 177 so that when the nut is rotated, the cooperation of the pins 175 in the slots 173 and the threads 169 will cause the objective slide to travel longitudinally in the way provided by the frame 155, the direction of movement of the focusing means being determined by the direction of rotation of the collar 171.

As heretofore mentioned, the eye-piece assembly 137 comprises the frame part 161, which is threaded upon the end of the frame extension 159 outwardly of the collar 171. The inner end of the frame 161 serves, when the same is assembled, to engage the outer end of the sleeve 171 and hold the same in place upon the barrel with the end of the barrel received in the notch provided by the flange 173. The frame 161 has a portion 179 within which is carried the cross-hair reticle 141. This reticle comprises an annular collar threaded to receive a cross-hair cell (not shown) and the threaded collar is adjustably mounted within the frame extension 179 for adjustment radially therein in order to align the cross-hair cell within the telescope. To this end, headed adjusting screws 181 are provided, said screws extending through perforations formed in the frame portion 179 with the heads of the screws exposed outwardly of said portion and the threaded shanks of the screws engaging in threaded sockets formed to receive them in the reticle collar. The outer end of the extension 179 is internally threaded to receive an eye-piece support frame 183 having an annular flange 185 affording a stop for limiting the threading movement of the support frame 183 into the end of the frame extension 179, said stop serving to lock and seal the parts together.

The frame 183 supports a lens carrier 187, in which is mounted an eye-piece lens cell 189. The carrier 187 comprises a sleeve formed with helical grooves 191 on its opposite sides and the frame 183 carries screws 193, the inner ends of which extend in the helical grooves 191. The eye-piece assembly provides for shifting the carrier 187 longitudinally within the slide-way provided by the frame 183 by turning the helically slotted carrier 187 within the frame 183, longitudinal movement being accomplished by the cooperation of the inwardly projecting screws 193 in the helical slots 191, it being remembered that the screws 193 are carried rigidly on the frame 183, which, in turn, is secured rigidly on the frame portion 179. The frame 179 forms a part of the frame 161, which is rigid with the extension 159 of the objective slide support frame 155, and this frame 155 is secured on the barrel of the telescope. In order to turn the carrier 187 to accomplish the adjustment of the eye-piece cell 189 to thereby focus the eyepiece cell upon the cross-hairs carried in the reticle 141, I provide a sleeve-like collar 195 having a skirt portion embracing the frame 183 and normally enclosing and concealing the heads of the screws 193. The sleeve-like collar 195 has an open end 197 adapted to abut the outer end of the frame 183, said end 197 being of restricted diameter and threaded or otherwise secured upon an end of the carrier 187 which projects outwardly of the frame 183. The sleeve-like collar 195 is fastened to the carrier 187 as by means of the fastening screws 199 and the outer surfaces of said sleeve-like collar are preferably knurled to facilitate turning of the same manually.

If desired, an eye-piece cover 201, having an aperture 203 may be threaded upon the extremity of the carrier 187 in order to finish the ocular end of the eye-piece assembly, the aperture 203 being, of course, in axial alignment with the lens cell 189. It will be noted that, in turning the adjustable eye-piece carrier, the collar 195 will be moved toward the right from the position shown in Figures 1 and 2, which will tend to uncover the heads of the screws 193. One of the purposes of forming the collar 195 as a sleeve-like cover for the screws 193 is to prevent exposure of the same and entrance of dirt and other foreign matter thereto. It is also desirable to enclose the heads of the reticle adjusting screws 181 and I accomplish this by means of the sleeve-like cover 205 having a head 207 adapted to bear snugly upon the outer surfaces of the collar 195. This head 207 may be internally grooved to receive resilient packing 208 to improve the sealing effect.

The sleeve-like cover element 205 also has a portion 209 at its other end formed for threaded engagement upon the enlarged portion of the frame 161 so that when the cover member 205 is applied, it will not only enclose the reticle adjusting screws 181 but will also form, with the collar 195, an expansible closure to prevent entrance of dirt and other foreign matter into the eye-piece assembly through the openings in the frame 183, which receives the screws 193. The cover member 205 is also provided with an extension 211 adapted to snugly overlie the outer end of the adjusting collar 171 of the objective slide in order to cover the joint between said collar and the abutting end of the frame 161 and thus prevent the entrance of dirt and other foreign matter at this point. If desired, the collar 171 may be provided with a groove containing packing 212 to improve the sealing effect.

If desired, the end of the cover, adjacent the turning element 195, and said turning element may be provided with a cooperating scale 213 and a gauge mark 215 in order to indicate the focused setting of the eye-piece.

It is thought that the invention and numerous of its attendant advantages will be understood from the foregoing description, and it is obvious that numerous changes may be made in the form, construction, and arrangement of the several parts of the illustrated apparatus without departing from the spirit or scope of my invention or sacrificing any of its attendant advantages, the forms herein described being merely for the purpose of illustrating the invention.

The invention is hereby claimed as follows:

1. A telescope comprising a cylindrical barrel having an objective lens cell mounted therein, a tubular support frame secured in said barrel and having a portion extending outwardly of an end of said barrel remote from said objective lens cell, said support frame having a cylindrical portion at said end of the barrel defining an annular chamber between the frame and the barrel, said frame forming an internal slideway and having a longitudinal slot therein opening between said slideway and said annular chamber, an objective focusing lens assembly movable in said slideway longitudinally of said barrel, adjusting means comprising a nut extending in said annular space, said nut having inwardly facing threaded portion, said focusing lens assembly having a cam member projecting through said slot in position drivingly engaging with said threaded portion, said nut having also a collar portion extending outwardly of the end of said barrel in position to slidingly engage the end of the barrel and exposed for manipulation to turn said nut, said frame outwardly of said nut having a means thereon forming an abutment in position to engage the collar portion and to retain the same between said abutment and the end of said barrel.

2. A telescope as set forth in claim 1, wherein the nut at the manually operable collar portion thereof is formed with a slot in position interfittingly receiving the end edge of said barrel whereby to provide a turnable joint between the collar and barrel to prevent entrance of foreign matter at the end of the barrel.

3. A telescope as set forth in claim 1, wherein the nut at the manually operable collar portion thereof is formed with a slot in position interfittingly receiving the end edge of said barrel whereby to provide a turnable joint between the collar and barrel to prevent entrance of foreign matter at the end of the barrel, and resilient gasket means in said groove in position to wipingly engage the end of said barrel.

4. A telescope as set forth in claim 1, including means forming an annular lip on said abutment means in position encircling the end of said collar portion remote from said barrel whereby to exclude foreign matter from entering between said collar portion and said abutment means.

5. A telescope as set forth in claim 1, wherein said frame outwardly of said manually operable collar portion carries a frame extension, a reticle cell supported by said extension in alignment with the objective focusing lens assembly, means exposed outwardly on said frame extension and operable for adjusting the alignment of said reticle cell, an eyepiece lens carrier on said frame extension and longitudinally movable therein in alignment with said reticle cell, said lens carrier having an end exposed outwardly of an end of said frame extension remote from said reticle cell, a manually operable collar on the outwardly extending portions of said lens carrier, said collar having a skirt overlying the end of said frame extension and a sleeve-like cover removable on said abutment means and having an annular edge at the one end thereof embracing and wiping upon the collar portion of said nut to form a running seal therewith, said cover, at its other end, having an annular portion wipingly engaging the said skirt to form a seal therewith for the exclusion of foreign matter, the cover having medial portions enclosing said frame extension and the portions of the reticle adjusting means exposed thereon.

ADOLPH LANGSNER.